(12) United States Patent
Yamashita et al.

(10) Patent No.: US 12,488,056 B2
(45) Date of Patent: Dec. 2, 2025

(54) DOCUMENT MANAGEMENT SYSTEM

(71) Applicant: TOYOTA JIDOSHA KABUSHIKI KAISHA, Toyota (JP)

(72) Inventors: Hiroyasu Yamashita, Toyota (JP); Kazuya Matsumoto, Nagoya (JP); Harufumi Muto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 18/544,433

(22) Filed: Dec. 19, 2023

(65) Prior Publication Data

US 2024/0232268 A1    Jul. 11, 2024

(30) Foreign Application Priority Data

Jan. 10, 2023   (JP) ................. 2023-001695

(51) Int. Cl.
*G06F 16/93*   (2019.01)
*G06F 40/279*  (2020.01)

(52) U.S. Cl.
CPC .......... *G06F 16/93* (2019.01); *G06F 40/279* (2020.01)

(58) Field of Classification Search
CPC ........................................ G06F 16/93
USPC ........................................... 715/200
See application file for complete search history.

(56) References Cited

U.S. PATENT DOCUMENTS

| | | | |
|---|---|---|---|
| 7,996,361 B1 * | 8/2011 | Shah | G06F 16/113 |
| | | | 707/634 |
| 11,295,076 B1 * | 4/2022 | Kumar | G06F 40/289 |
| 11,379,670 B1 * | 7/2022 | Liu | G06F 40/284 |
| 11,966,702 B1 * | 4/2024 | Wilkinson | G06N 3/045 |
| 2004/0243403 A1 * | 12/2004 | Matsunaga | G06V 30/418 |
| | | | 704/209 |
| 2005/0010863 A1 * | 1/2005 | Zernik | G06F 40/131 |
| | | | 715/229 |
| 2014/0280047 A1 * | 9/2014 | Shukla | G06F 16/24554 |
| | | | 707/769 |
| 2017/0060945 A1 * | 3/2017 | Bastide | G06F 16/24542 |
| 2018/0137090 A1 * | 5/2018 | Duan | G06F 40/30 |
| 2019/0361843 A1 * | 11/2019 | Stoddard | G06F 16/1834 |
| 2020/0201828 A1 * | 6/2020 | Ren | G06F 18/22 |
| 2022/0043771 A1 * | 2/2022 | Saad | G06F 16/2246 |
| 2022/0253423 A1 * | 8/2022 | Neale | G06F 16/2291 |
| 2022/0318315 A1 * | 10/2022 | Wyle | G06V 30/1448 |
| 2022/0319219 A1 * | 10/2022 | Tsibulevskiy | G06F 18/40 |
| 2022/0342902 A1 * | 10/2022 | Falkinder | G06F 16/2219 |
| 2023/0185505 A1 * | 6/2023 | Kim | G06F 16/11 |
| | | | 345/156 |
| 2024/0062572 A1 * | 2/2024 | Kim | G06V 30/414 |

(Continued)

FOREIGN PATENT DOCUMENTS

JP      2004355074 A    12/2004

*Primary Examiner* — Reza Nabi

(57) ABSTRACT

Processing circuitry of a document management system calculates a first similarity between a block in a first level of a first document and a block in a second level of a second document, calculates a similarity between a block in a second level of the first document and a block in a second level of the second document as a second similarity, calculates a combined similarity based on the first similarity and the second similarity, and associates the block in the first level of the first document with the block in the first level of the second document based on the combined similarity.

4 Claims, 5 Drawing Sheets

(56) References Cited

U.S. PATENT DOCUMENTS

2024/0232268 A1\* 7/2024 Yamashita .............. G06F 16/93
2025/0053818 A1\* 2/2025 Chorakhalikar ....... G06N 3/045

\* cited by examiner

Fig.5

| Heading Number | Parent-Parent Level | Similarity | Parent Level | Similarity | Subject Level | Similarity | Combined Similarity XA |
|---|---|---|---|---|---|---|---|
| 1. | - | | - | | Scope | 0.05 | 0.05 |
| 2. | - | | - | | Terms and Definitions | 0.05 | 0.05 |
| 3. | - | | - | | General Requirements | 0.10 | 0.10 |
| 3.1. | - | | General Requirements | 0.10 | XX Device | 0.10 | 0.12 |
| 3.1.1. | General Requirements | 1.00 | XX Device | 1.00 | Number of Items:2 | 1.00 | 1.25 |
| 4. | - | | - | | Special Provisions | 0.10 | 0.10 |
| 4.1 | - | | Special Provisions | 0.10 | XX Device | 0.10 | 0.12 |
| 4.1.1. | Special Provisions | 0.10 | XX Device | 1.00 | Number of Items:3 | 0.50 | 0.71 |

| Heading Number | Parent-Parent Level | Similarity | Parent Level | Similarity | Subject Level | Similarity | Combined Similarity XA |
|---|---|---|---|---|---|---|---|
| 1. | - | | - | | Scope of Application | 0.10 | 0.10 |
| 2. | - | | - | | Definitions | 0.05 | 0.05 |
| 3. | - | | - | | General Specifications | 0.10 | 0.10 |
| 3.1. | - | | General Specifications | 0.10 | XX Device | 0.10 | 0.12 |
| 3.1.1. | General Specifications | 0.50 | XX Device | 1.00 | Number of Items:2 | 1.00 | 1.23 |
| 3.2. | - | | General Specifications | 0.10 | YY Device | 0.10 | 0.12 |
| 3.2.1. | General Specifications | 0.50 | YY Device | 0.10 | Number of Items:2 | 1.00 | 1.05 |
| 4. | - | | - | | Special Provisions | 0.10 | 0.10 |
| 4.1. | - | | Special Provisions | 0.10 | XX Device | 0.10 | 0.12 |
| 4.1.1. | Special Provisions | 0.10 | XX Device | 1.00 | Number of Items:2 | 1.00 | 1.21 |

DOCUMENT MANAGEMENT SYSTEM

RELATED APPLICATION

The present application claims priority of Japanese Patent Application No. 2023-001695 filed on Jan. 10, 2023, the disclosure of which is hereby incorporated by reference herein in its entirety.

BACKGROUND

1. Field

The following description relates to a document management system.

2. Description of Related Art

Japanese Laid-Open Patent Publication No. 2004-355074 discloses an example of a document management system that compares a first document with a second document. The documents managed by the system have hierarchical structures and are provided with headings indicating chapters and sections. The system divides each document into blocks by grouping the text of the document in accordance with the headings. Then, the system detects the corresponding relationship between the blocks of the first document and the blocks of the second document. Specifically, the system finds a block of the second document that has a high similarity to a first block of the first document, and associates the block with the first block of the first document.

In the document having the hierarchical structure, the text in lower levels is likely to be shorter and frequently has the same description. Thus, when the blocks are associated based only on a similarity between blocks in a low level, an unrelated block of the second document may be associated with the first block of the first document.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a document management system is configured to manage documents. Each of the documents has a hierarchical structure. The hierarchical structure includes at least a first level and a second level higher than the first level. The document management system includes processing circuitry. The processing circuitry is configured to calculate a first similarity between a block in the first level of a first document and a block in the first level of a second document. The processing circuitry is configured to calculate a similarity between a block in the second level of the first document and a block in the second level of the second document as a second similarity between the block in the first level of the first document and the block in the first level of the second document. The processing circuitry is configured to calculate a combined similarity such that the combined similarity increases as the first similarity increases and such that the combined similarity increases as the second similarity increases. The processing circuitry is configured to associate the block in the first level of the first document with the block in the first level of the second document based on the combined similarity.

Other features and aspects will be apparent from the following detailed description, the drawings, and the claims.

BRIEF DESCRIPTION OF THE DRAWINGS

FIG. 5 is a diagram illustrating a similarity between a block of a first document and a block of a second document.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a document management system will now be described with reference to FIGS. 1 to 5.

Figure 1:
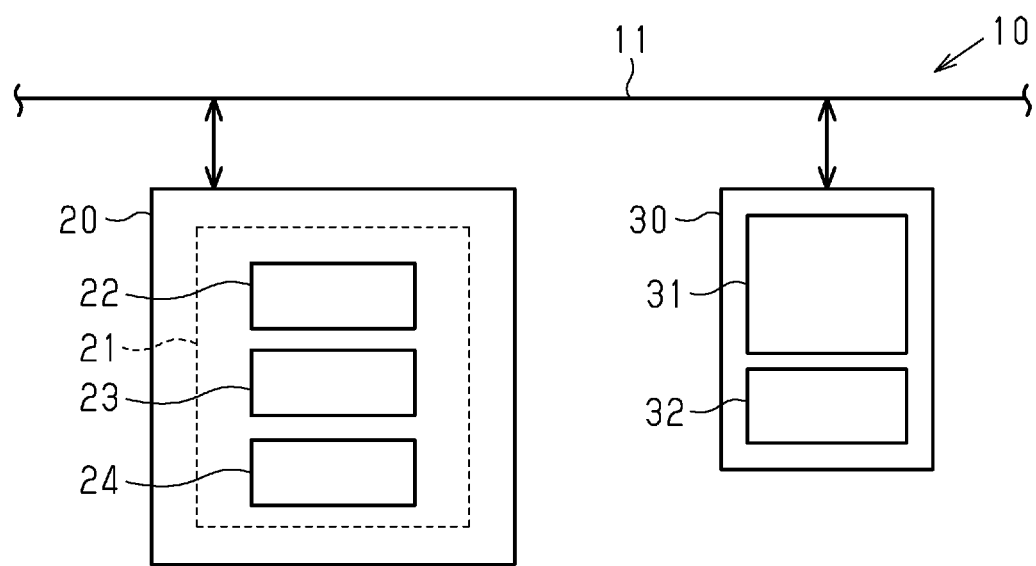
FIG. 1 is a block diagram schematically showing a document management system according to an embodiment.

As shown in FIG. 1, a document management system 10 is a system for managing a plurality of documents. The document management system 10 includes an information processor 20 and a terminal device 30. The terminal device 30 is configured to exchange various types of information with the information processor 20 via a communication line 11, such as a local area network (LAN).

Managed Documents

Figure 2:
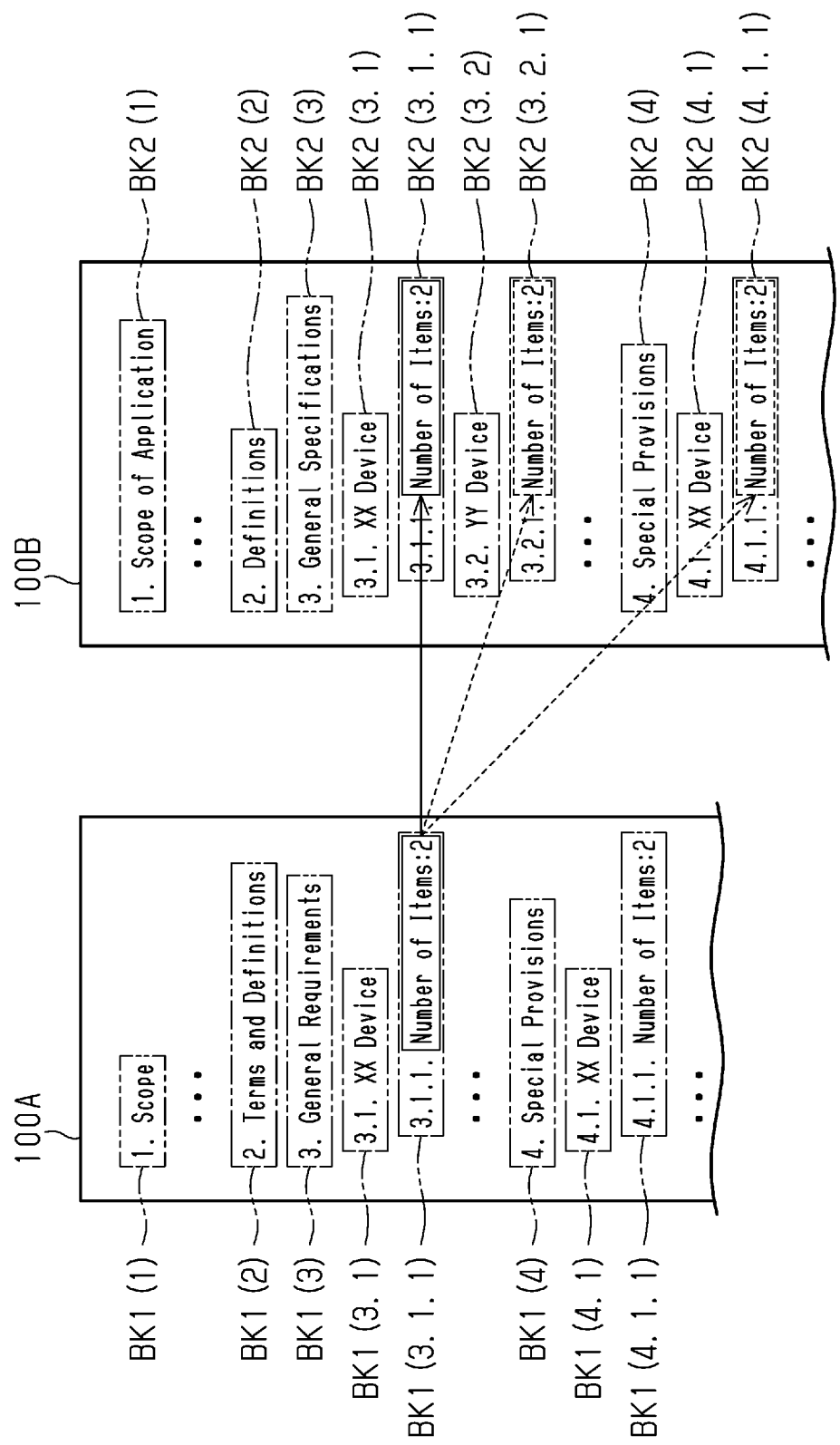
FIG. 2 is a diagram showing an example of a first document and a second document managed by the document management system of FIG. 1.

An example of a document managed by the document management system 10 will now be described with reference to FIG. 2. For example, the document is a regulatory document. FIG. 2 shows a first document 100A and a second document 100B. For example, the first document 100A is a regulatory document of country A, and the second document 100B is a regulatory document of country B that corresponds to the first document 100A.

The first document 100A and the second document 100B each includes texts. Each of the first document 100A and the second document 100B has a hierarchical structure with headings such as chapters, sections, and subsections. In both the first document 100A and the second document 100B, a heading number is assigned to each heading.

In the first document 100A and the second document 100B, a chapter number is assigned to the heading of the Nth chapter as a heading number. A chapter number and a section number are assigned to the heading of the Mth section of the Nth chapter. A chapter number, a section number, and a subsection number are assigned to the heading of the Lth subsection of the Mth section of the Nth chapter. Each of "N", "M" and "L" is an integer greater than or equal to 1. For example, "3." is assigned to the heading of the third chapter as a heading number. Further, for example, "3.1." is assigned to the heading of the first section of the third chapter as a heading number. Furthermore, for example, "3.1.1." is assigned to the heading of the first subsection of the first section of the third chapter as a heading number.

The first document 100A and the second document 100B can be divided into blocks by sorting the text in accordance with the headings. For example, the first document 100A has block BK1 (1) indicating the heading of the first chapter, block BK1 (2) indicating the heading of the second chapter, block BK1 (3) indicating the heading of the third chapter, and block BK1 (4) indicating the heading of the fourth chapter. The first document 100A has block BK1 (3.1) indicating the heading of the first section of the third chapter, and block BK1 (4.1) indicating the heading of the first section of the fourth chapter. The first document 100A has block BK1 (3.1.1) indicating the heading of the first subsection of the first section of the third chapter, and block BK1 (4.1.1) indicating the heading of the first subsection of the first section of the fourth chapter.

For example, the second document 100B has block BK2 (1) indicating the heading of the first chapter, block BK2 (2) indicating the heading of the second chapter, block BK2 (3) indicating the heading of the third chapter, and block BK2 (4) indicating the heading of the fourth chapter. The second document 100B has block BK2 (3.1) indicating the heading of the first section of the third chapter, block BK2 (3.2) indicating the heading of the second section of the third chapter, and block BK2 (4.1) indicating the heading of the first section of the fourth chapter. The second document 100B has block BK2 (3.1.1) indicating the heading of the first subsection of the first section of the third chapter, block BK2 (3.2.1) indicating the heading of the first subsection of the first section of the second chapter, and block BK2 (4.1.1) indicating the heading of the first subsection of the first section of the fourth chapter.

When the block indicating the heading of the Lth subsection of the Mth section of the Nth chapter is a block in a first level, the block indicating the heading of the Mth section of the Nth chapter corresponds to a block in a second level, and the block indicating the heading of the Nth chapter corresponds to a block of in a third level. For example, in the first document 100A, a block in one level higher than block BK1 (3.1.1), indicating the heading of the first subsection of the first section of the third chapter, is block BK1 (3.1), indicating the heading of the first section of the third chapter. Further, a block in one level higher than block BK1 (3.1) is block BK1 (3), indicating the heading of the third chapter. For example, in the second document 100B, a block in one level higher than block BK2 (3.1.1), indicating the heading of the first subsection of the first section of the third chapter, is block BK2 (3.1), indicating the heading of the first section of the third chapter. Further, a block in one level higher than block BK2 (3.1) is block BK2 (3), indicating the heading of the third chapter. Hereinafter, the block in the first level is referred to as "the first block", and the block in one level higher than the first block is referred to as "the block in the parent level" of the first block. The block in one level higher than "the block in the parent level" is referred to as "the block in the parent-parent level" of the first block.

Information Processor

As shown in FIG. 1, the information processor 20 includes processing circuitry 21. The processing circuitry 21 is, for example, a microcomputer. In this case, the processing circuitry 21 includes a CPU 22, a first memory 23, and a second memory 24. The first memory 23 stores control programs executed by the CPU 22. The second memory 24 stores a plurality of documents managed by the information processor 20, such as the first document 100A and the second document 100B. When the CPU 22 executes the control programs, the processing circuitry 21 analyzes the documents. Specifically, the processing circuitry 21 divides the documents 100A and 100B into blocks in accordance with the headings. Then, the processing circuitry 21 associates the blocks BK1 of the first document 100A with the blocks BK2 of the second document 100B.

Terminal Device

The terminal device 30 includes a display unit 31 and an operation unit 32 as user interfaces. The display unit 31 shows information received from the information processor 20, for example, an analysis result of the documents. The operation unit 32 is operated by an operator in accordance with the information shown on the display unit 31. The operation unit 32 includes, for example, a keyboard and a mouse. The terminal device 30 transmits information corresponding to the operation of the operation unit 32 by the operator to the information processor 20.

Block Association Process

A block association process M10 executed by the document management system 10 will now be described with reference to FIGS. 3 to 5. The block association process M10 is a series of processes for dividing each of the documents 100A and 100B into blocks and associating the blocks BK1 of the first document 100A with the blocks BK2 of the second document 100B. The CPU 22 executes the control programs in the first memory 23 to initiate the block association process M10.

Figure 3:
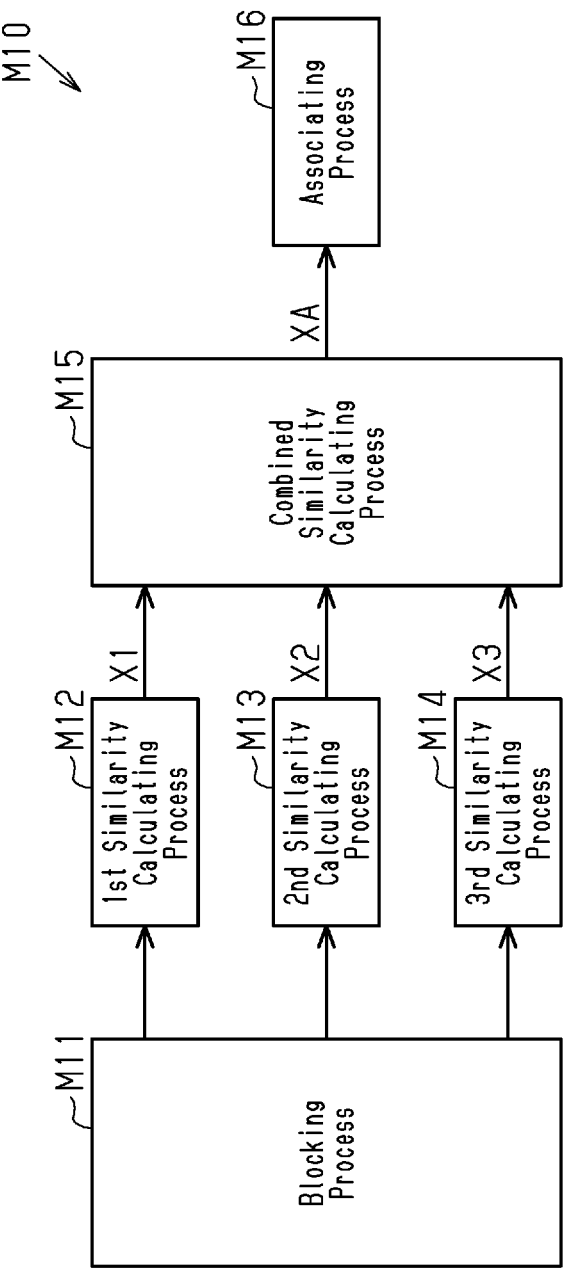
FIG. 3 is a block diagram showing a plurality of processes executed by an information processor of the document management system of FIG. 1.
Figure 4:
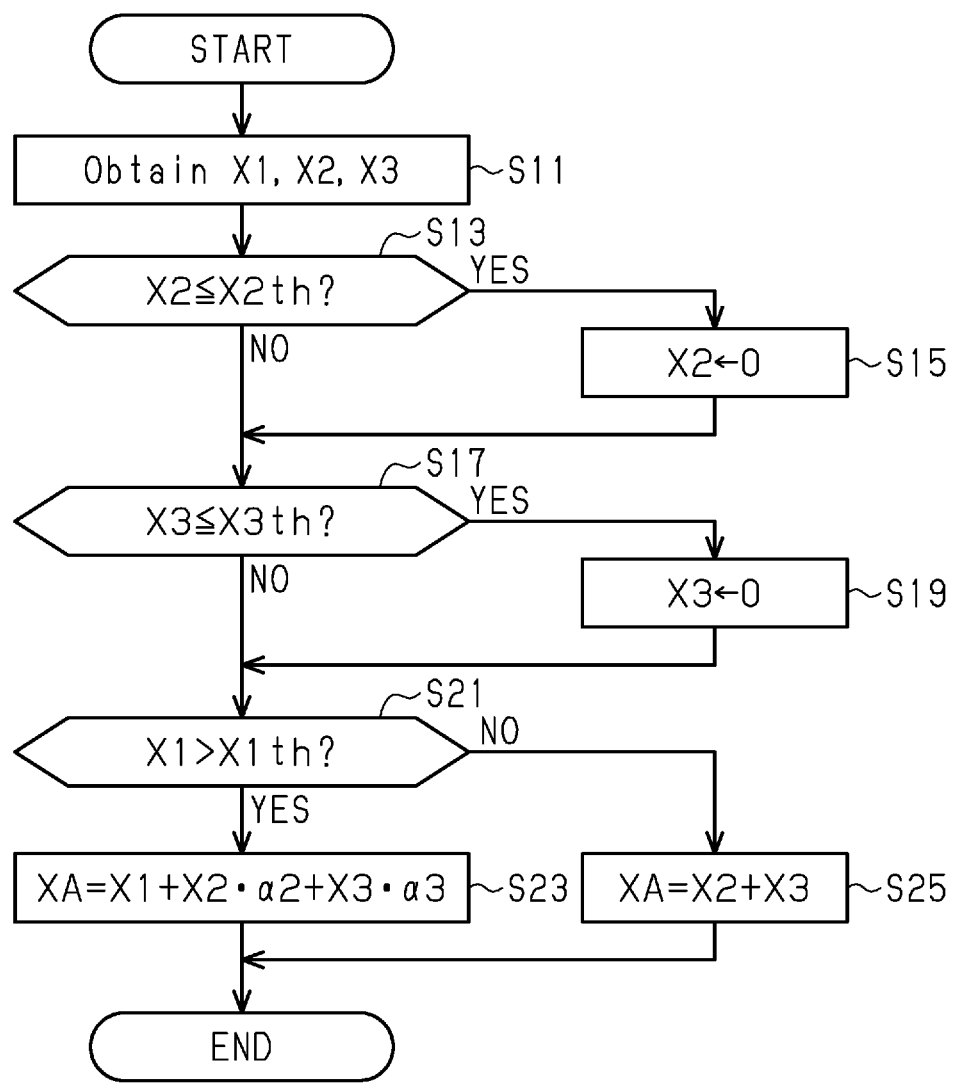
FIG. 4 is a flowchart illustrating an association process executed by the information processor of FIG. 3.

As shown in FIG. 3, the block association process M10 includes a blocking process M11, a first similarity calculating process M12, a second similarity calculating process M13, a third similarity calculating process M14, a combined similarity calculating process M15, and an associating process M16.

Blocking Process

In the blocking process M11, the processing circuitry 21 divides the first document 100A into the blocks BK1 by segmenting the first document 100A in accordance with the headings as shown in FIG. 2. In this case, the processing circuitry 21 finds the heading numbers of the first document 100A. Then, the processing circuitry 21 divides the first document 100A into the blocks BK1 based on the found heading numbers. In the same manner, the processing circuitry 21 divides the second document 100B into the blocks BK2 by segmenting the second document 100B in accordance with the headings.

First Similarity Calculating Process

In a first similarity calculating process M12, the processing circuitry 21 calculates a first similarity X1 between a block and another block. For example, when the first similarity X1 between the first block and the second block is calculated, the processing circuitry 21 vectorizes the text in the first block and the text in the second block to calculate the first similarity X1 between the first block and the second block.

The similarity between texts can be obtained using, for example, a learned model that underwent machine learning. In this case, the processing circuitry 21 vectorizes the texts in subject blocks. Then, the processing circuitry 21 inputs the vectorized texts to the learned model and obtains the similarity between two blocks as a numerical value. For example, when the text in the first block is identical to the text in the second block, the similarity is higher than when the text in the first block does not match the text in the second block. Even if the text in the first block is not identical to the text in the second block, when the text in the first block partially matches the text in the second block, the similarity is higher than when the text in the first block and the text in the second block do not match at all. Furthermore, when the text in the first block and the text in the second block do not match at all, if the text in the first block and the text in the second block have the same number of characters, the similarity is higher than when the text in the first block and the text in the second block have different numbers of characters.

The learned model capable of calculating the similarity between blocks is, for example, "SentenceBERT". The processing circuitry 21 may use a learned model other than "SentenceBERT" as long as the similarity between texts is obtained.

In the present embodiment, the processing circuitry 21 calculates the first similarity X1 between block BK1 of the first document 100A and block BK2 of the second document 100B. Specifically, the processing circuitry 21 calculates the first similarity X1 between block BK1 in the first level of the first document 100A and block BK2 in the first level of the second document 100B.

FIG. 5 shows an example in which the first similarity X1 between block BK1 (3.1.1) of the first document 100A and blocks BK2 of the second document 100B are calculated. The numerical values indicating the similarities illustrated in FIG. 5 are examples. As shown in FIG. 2, block BK1 (3.1.1) of the first document 100A and block BK2 (3.1.1) of the second document 100B have identical text. Also, block BK1 (3.1.1) of the first document 100A and block BK2 (3.2.1) of the second document 100B have identical text. Further, block BK1 (3.1.1) of the first document 100A and block BK2 (4.1.1) of the second document 100B have identical text. Therefore, the processing circuitry 21 calculates "1.00" as the first similarity X1 between block BK1 (3.1.1) and block BK2 (3.1.1). The processing circuitry 21 calculates "1.00" as the first similarity X1 between block BK1 (3.1.1) and block BK2 (3.2.1). The processing circuitry 21 calculates "1.00" as the first similarity X1 between block BK1 (3.1.1) and block BK2 (4.1.1).

The processing circuitry 21 calculates the first similarities X1 between block BK1 in the first level of the first document 100A and blocks BK2 in the second level of the second document 100B. As shown in FIG. 2, block BK1 (3.1.1) of the first document 100A and block BK2 (3.1) of the second document 100B have different texts. Block BK1 (3.1.1) of the first document 100A and block BK2 (4.1) of the second document 100B have different texts. Therefore, as shown in FIG. 5, the processing circuitry 21 calculates "0.10" as the first similarity X1 between block BK1 (3.1.1) and block BK2 (3.1). The processing circuitry 21 calculates "0.10" as the first similarity X1 between block BK1 (3.1.1) and block BK2 (4.1).

The processing circuitry 21 calculates the first similarities X1 between block BK1 in the first level of the first document 100A and blocks BK2 in the third level of the second document 100B. As shown in FIG. 2, block BK1 (3.1.1) of the first document 100A and block BK2 (1) of the second document 100B have different texts. Block BK1 (3.1.1) of the first document 100A and block BK2 (2) of the second document 100B are different from each other in the number of characters and the text. Block BK1 (3.1.1) of the first document 100A and block BK2 (3) of the second document 100B have different texts. Block BK1 (3.1.1) of the first document 100A and block BK2 (4) of the second document 100B have different texts. Therefore, as shown in FIG. 5, the processing circuitry 21 calculates "0.10" as the first similarity X1 between block BK1 (3.1.1) and block BK2 (1). The processing circuitry 21 calculates "0.05" as the first similarity X1 between block BK1 (3.1.1) and block BK2 (2). The processing circuitry 21 calculates "0.10" as the first similarity X1 between block BK1 (3.1.1) and block BK2 (3). The processing circuitry 21 calculates "0.10" as the first similarity X1 between block BK1 (3.1.1) and block BK2 (4).

The processing circuitry 21 also calculates the first similarities X1 between block BK1 differing from block BK1 (3.1.1) of the first document 100A and blocks BK2 of the second document 100B.

The processing circuitry 21 also calculates the first similarities X1 between blocks BK1 of the first document 100A.

Second Similarity Calculating Process

In the second similarity calculating process M13, the processing circuitry 21 calculates a second similarity X2 between a block and another block. For example, when the processing circuitry 21 calculates the second similarity X2 between the first block and the second block, the processing circuitry 21 vectorizes the text of the block in the parent level of the first block and the text of the block in the parent level of the second block. The processing circuitry 21 calculates the similarity between the block in the parent level of the first block and the block in the parent level of the second block as the second similarity X2 between the first block and the second block. The processing circuitry 21 uses the learned model in the same manner as in the first similarity calculating process M12 to calculate the similarity between the block in the parent level of the first block and the block in the parent level of the second block.

In the present embodiment, the processing circuitry 21 calculates the similarity between block BK1 in the second level of the first document 100A and block BK2 in the second level of the second document 100B as the second similarity X2 between block BK1 in the first level of the first document 100A and block BK2 in the first level of the second document 100B.

FIG. 5 shows an example in which the second similarities X2 between block BK1 (3.1.1) of the first document 100A and blocks BK2 of the second document 100B are calculated. The processing circuitry 21 calculates the similarity between block BK1 (3.1) in the second level of the first document 100A and block BK2 (3.1) in the second level of the second document 100B as the second similarity X2 between block BK1 (3.1.1) and block BK2 (3.1.1). Block BK1 (3.1) is in the parent level of block BK1 (3.1.1). Block BK2 (3.1) is in the parent level of block BK2 (3.1.1). As shown in FIG. 2, block BK1 (3.1) of the first document 100A and block BK2 (3.1) of the second document 100B have identical text. Therefore, the processing circuitry 21 calculates "1.00" as the second similarity X2 between block BK1 (3.1.1) and block BK2 (3.1.1).

The processing circuitry 21 calculates the similarity between block BK1 (3.1) in the second level of the first document 100A and block BK2 (3.2) in the second level of the second document 100B as the second similarity X2 between block BK1 (3.1.1) and block BK2 (3.2.1). Block BK1 (3.1) is in the parent level of block BK1 (3.1.1). Block BK2 (3.2) is in the parent level of block BK2 (3.2.1). As shown in FIG. 2, block BK1 (3.1) of the first document 100A and block BK2 (3.2) of the second document 100B have different texts. Therefore, the processing circuitry 21 calculates "0.10" as the second similarity X2 between block BK1 (3.1.1) and block BK2 (3.2.1).

The processing circuitry 21 calculates the similarity between block BK1 (3.1) in the second level of the first document 100A and block BK2 (4.1) in the second level of the second document 100B as the second similarity X2 between block BK1 (3.1.1) and block BK2 (4.1.1). Block BK1 (3.1) is in the parent level of block BK1 (3.1.1). Block BK2 (4.1) is in the parent level of block BK2 (4.1.1). As shown in FIG. 2, block BK1 (3.1) of the first document 100A and block BK2 (4.1) of the second document 100B have identical text. Therefore, the processing circuitry 21 calculates "0.10" as the second similarity X2 between block BK1 (3.1.1) and block BK2 (4.1.1).

In the present embodiment, the processing circuitry 21 calculates the similarity between block BK1 in the second level of the first document 100A and block BK2 in the third level of the second document 100B as the second similarity X2 between block BK1 in the first level of the first document 100A and block BK2 in the second level of the second document 100B.

In an example, the processing circuitry 21 calculates the similarity between block BK1 (3.1) in the second level of the first document 100A and block BK2 (3) in the third level of the second document 100B as the second similarity X2 between block BK1 (3.1.1) and block BK2 (3.1). Block BK1 (3.1) is in the parent level of block BK1 (3.1.1). Block BK2 (3) is in the parent level of block BK2 (3.1). As shown in FIG. 2, block BK1 (3.1) of the first document 100A and block BK2 (3) of the second document 100B have difference texts. Therefore, the processing circuitry 21 calculates "0.10" as the second similarity X2 between block BK1 (3.1.1) and block BK2 (3.1).

The processing circuitry 21 also calculates the second similarities X2 between block BK1 differing from block BK1 (3.1.1) of the first document 100A and blocks BK2 of the second document 100B.

The processing circuitry 21 also calculates the second similarities X2 between blocks BK1 of the first document 100A.

Third Similarity Calculating Process

In the third similarity calculating process M14, the processing circuitry 21 calculates a third similarity X3 between a block and another block. For example, when the processing circuitry 21 calculates the third similarity X3 between the first block and the second block, the processing circuitry 21 vectorizes the text of the block in the parent-parent level of the first block and the text of the block in the parent-parent level of the second block. The processing circuitry 21 calculates the similarity between the block in the parent-parent level of the first block and the block in the parent-parent level of the second block as the third similarity X3 between the first block and the second block. The processing circuitry 21 uses the learned model in the same manner as in the first similarity calculating process M12 to calculate the similarity between the block in the parent-parent level of the first block and the block in the parent-parent level of the second block.

In the present embodiment, the processing circuitry 21 calculates the similarity between block BK1 in the third level of the first document 100A and block BK2 in the third level of the second document 100B as the third similarity X3 between block BK1 in the first level of the first document 100A and block BK2 in the first level of the second document 100B.

FIG. 5 shows an example in which the third similarities X3 between block BK1 (3.1.1) of the first document 100A and blocks BK2 of the second document 100B are calculated. The processing circuitry 21 calculates the similarity between block BK1 (3) in the third level of the first document 100A and block BK2 (3) in the third level of the second document 100B as the third similarity X3 between block BK1 (3.1.1) and block BK2 (3.1.1). Block BK1 (3) is in the parent-parent level of block BK1 (3.1.1). Block BK2 (3) is in the parent-parent level of block BK2 (3.1.1). As shown in FIG. 2, the text of block BK1 (3) of the first document 100A and the text of block BK2 (3) of the second document 100B do not completely coincide with each other. However, both contain the word "general". Therefore, the processing circuitry 21 calculates "0.50" as the third similarity X3 between block BK1 (3.1.1) and block BK2 (3.1.1).

The processing circuitry 21 calculates the similarity between block BK1 (3) in the third level of the first document 100A and block BK2 (3) in the third level of the second document 100B as the third similarity X3 between block BK1 (3.1.1) and block BK2 (3.2.1). In this case, the processing circuitry 21 calculates "0.50" as the third similarity X3 between block BK1 (3.1.1) and block BK2 (3.2.1).

The processing circuitry 21 calculates the similarity between block BK1 (3) in the third level of the first document 100A and block BK2 (4) in the third level of the second document 100B as the third similarity X3 between block BK1 (3.1.1) and block BK2 (4.1.1). Block BK1 (3) is in the parent-parent level of block BK1 (3.1.1). Block BK2 (4) is in the parent-parent level of block BK2 (4.1.1). As shown in FIG. 2, the text does not match between block BK1 (3) of the first document 100A and block BK2 (4) of the second document 100B. Therefore, the processing circuitry 21 calculates "0.10" as the third similarity X3 between block BK1 (3.1.1) and block BK2 (4.1.1).

The processing circuitry 21 also calculates the third similarities X3 between block BK1 differing from block BK1 (3.1.1) of the first document 100A and blocks BK2 of the second document 100B.

The processing circuitry 21 also calculates the third similarities X3 between blocks BK1 of the first document 100A.

Combined Similarity Calculating Process

In the combined similarity calculating processing M15, the processing circuitry 21 calculates a combined similarity XA between blocks BK1 of the first document 100A and blocks BK2 of the second document 100B. In this case, the processing circuitry 21 calculates the combined similarity XA based on at least the first similarity X1, among the first similarity X1, the second similarity X2, and the third similarity X3. Specifically, the processing circuitry 21 calculates the combined similarity XA as follows.

The processing circuitry 21 calculates the combined similarity XA such that the combined similarity XA increases as the first similarity X1 increases.

When the processing circuitry 21 calculates the combined similarity XA based on the second similarity X2, the processing circuitry 21 calculates the combined similarity XA such that the combined similarity XA increases as the second similarity X2 increases.

When the processing circuitry 21 calculates the combined similarity XA based on the third similarity X3, the processing circuitry 21 calculates the combined similarity XA such that the combined similarity XA increases as the third similarity X3 increases.

In the present embodiment, the processing circuitry 21 calculates the combined similarity XA between block BK1 in the first level in the first document 100A and block BK2 in the first level in the second document 100B based on the first similarity X1, the second similarity X2, and the third similarity X3. For example, the processing circuitry 21 calculates the combined similarity XA between block BK1 (3.1.1) and block BK2 (3.1.1) based on the first similarity X1, the second similarity X2, and the third similarity X3 between block BK1 (3.1.1) and block BK2 (3.1.1).

The processing circuitry 21 calculates combined similarities XA between block BK1 in the first level of the first document 100A and block BK2 in the second level of the second document 100B based on the first similarity X1 and the second similarity X2. For example, the processing circuitry 21 calculates the combined similarity XA between block BK1 (3.1.1) and block BK2 (3.1) based on the first similarity X1 and the second similarity X2 between block BK1 (3.1.1) and block BK2 (3.1).

The processing circuitry 21 calculates the combined similarity XA between block BK1 in the first level of the first document 100A and block BK2 in the third level of the second document 100B based on the first similarity X1. For example, the processing circuitry 21 calculates the combined similarity XA between block BK1 (3.1.1) and block BK2 (3) based on the first similarity X1 between block BK1 (3.1.1) and block BK2 (3).

The processing circuitry 21 also calculates the combined similarities XA between block BK1 differing from block BK1 (3.1.1) of the first document 100A and blocks BK2 of the second document 100B.

The processing circuitry 21 also calculates the combined similarities XA between blocks BK1 of the first document 100A.

The flow the combined similarity calculating process M15 will now be described with reference to FIG. 4.

In step S11, the processing circuitry 21 obtains the first similarity X1 calculated in the first similarity calculating process M12, the second similarity X2 calculated in the second similarity calculating process M13, and the third similarity X3 calculated in the third similarity calculating process M14.

In step S13, the processing circuitry 21 determines whether the second similarity X2 obtained in step S11 is less than or equal to a determination value X2th. When the second similarity X2 is low, the block in the parent level of block BK2 in the second document 100B is not similar to the block in the parent level of block BK1 in the first document 100A. Thus, there is no need to consider the second similarity X2 when estimating the relevance between block BK1 and block BK2. Therefore, the determination value X2th is set as a reference for determining whether it is necessary to consider the second similarity X2 when estimating the relevance between the block BK1 and the block BK2. When the second similarity X2 is less than or equal to the determination value X2h (S13: YES), the processing circuitry 21 proceeds to step S15. When the second similarity X2 is greater than the determination value X2th (S13: NO), the processing circuitry 21 proceeds to step S17.

In step S15, the processing circuitry 21 sets the second similarity X2 to zero. Then, the processing circuitry 21 proceeds to step S17.

In step S17, the processing circuitry 21 determines whether the third similarity X3 obtained in step S11 is less than or equal to a determination value X3th. When the third similarity X3 is low, the block in the parent-parent level of block BK2 in the second document 100B is not similar to the block in the parent-parent level of block BK1 in the first document 100A. Thus, there is no need to consider the third similarity X3 when estimating the relevance between block BK1 and block BK2. Therefore, the determination value X3th is set as a reference for determining whether it is necessary to consider the third similarity X3 when estimating the relevance between the block BK1 and the block BK2. When the third similarity X3 is less than or equal to the determination value X3th (S17: YES), the processing circuitry 21 proceeds to step S19. When the third similarity X3 is greater than the determination value X3th (S17: NO), the processing circuitry 21 proceeds to step S21.

In step S19, the processing circuitry 21 sets the third similarity X3 to zero Then, the processing circuitry 21 proceeds to step S21.

In step S21, the processing circuitry 21 determines whether the first similarity X1 obtained in step S11 is higher than a determination value X1th. When the first similarity X1 is low, block BK2 of the second document 100B are not similar to block BK1 of the first document 100A. Thus, there is no need to consider the first similarity X1 when estimating the relevance between block BK1 and block BK2. Therefore, the determination value X1th is set as a reference for determining whether it is necessary to consider the first similarity X1 when estimating the relevance between the block BK1 and the block BK2. When the first similarity X1 is higher than the determination value X1th (S21: YES), the processing circuitry 21 proceeds to step S23. When the first similarity X1 is less than or equal to the determination value X1th (S21: NO), the processing circuitry 21 proceeds to step S25.

In step S23, the processing circuitry 21 calculates the combined similarity XA using the following relational equation (D1). In the relational equation (D1), "α2" is a correction coefficient for decreasing the second similarity X2. Further, "α3" is a correction coefficient for deceasing the third similarity X3.

$$XA = X1 + X2 \times \cdot \alpha2 + X3 \times \alpha3 \quad (D1)$$

In the present embodiment, the correction coefficients α2 and α3 are set to values greater than 0 and less than 1. Therefore, the processing circuitry 21 calculates the combined similarity XA such that the effect of the second similarity X2 on the combined similarity XA is less than that of the first similarity X1 on the combined similarity XA. Further, the processing circuitry 21 calculates the combined similarity XA such that the effect of the third similarity X3 on the combined similarity XA is less than that of the first similarity X1 on the combined similarity XA.

Further, the correction coefficient α3 is set to a value smaller than the correction coefficient α2. Thus, the processing circuitry 21 can calculate the combined similarity XA such that the effect of the third similarity X3 on the combined similarity XA is less than that of the second similarity X2 on the combined similarity XA.

In step S25, the processing circuitry 21 calculates the sum of the second similarity X2 and the third similarity X3 as the combined similarity XA.

When the combined similarity XA is calculated in step S23 or step S25, the processing circuitry 21 ends the series of processes.

Associating Process

As shown in FIG. 3, in the associating process M16, the processing circuitry 21 associates block BK1 of the first document 100A with block BK2 of the second document 100B based on the combined similarity XA. For example, the processing circuitry 21 associates the first block of the first document 100A with one of blocks BK2 of the second document 100B. In this case, the processing circuitry 21 associates the second block of blocks BK2, having the highest combined similarity XA with the first block, with the first block. The processing circuitry 21 also associates another one of blocks BK1, differing from the first block, with another one of blocks BK2.

Operation of Present Embodiment

The operation of the document management system 10 will now be described with reference to FIGS. 2 and 5.

The information processor 20 divides the first document 100A into blocks BK1 by segmenting the first document 100A in accordance with the headings. Further, the information processor 20 divides the second document 100B into blocks BK2 by segmenting the second document 100B in accordance with the headings.

Subsequently, the information processor 20 calculates the first similarity X1 between block BK1 of the first document 100A and block BK2 of the second document 100B. Further, the information processor 20 calculates the similarity between the block in the parent level of block BK1 of the first document 100A and the block in the parent level of block BK2 of the second document 100B as the second similarity X2 between block BK1 and block BK2. Furthermore, the information processor 20 calculates the similarity between the block in the parent-parent level of block BK1 of the first document 100A and the block in the parent-parent level of block BK2 of the second document 100B as the third similarity X3 between block BK1 and block BK2.

The information processor 20 calculates the combined similarity XA between block BK1 and block BK2 based on the first similarity X1, the second similarity X2, and the third similarity X3. Then, the information processor 20 associates block BK1 of the first document 100A with block BK2 of the second document 100B based on the combined similarity XA. For example, block BK2 having the highest combined similarity XA with block BK1 is associated with block BK1.

Advantages of Present Embodiment (1) When the relevance between the first block of the first document 100A and the second block of the second document 100B is actually high, the similarity between the block in the parent level of the first block and the block in the parent level of the second block is likely to be high. On the other hand, when the first block of the first document 100A is actually irrelevant to the second block of the second document 100B, the similarity between the block in the parent level of the first block and the block in the parent level of the second block is likely to be low. Therefore, when the document management system 10 associates block BK1 of the first document 100A and block BK2 of the second document 100B, the second similarity X2 between the blocks is taken into consideration in addition to the first similarity X1. This improves the accuracy of the association between block BK1 of the first level in the first document 100A and block BK2 of the first level in the second document 100B.

For example, the first similarity X1 between block BK1 (3.1.1) of the first document 100A and block BK2 (3.2.1) of the second document 100B is equal to the first similarity X1 between block BK1 (3.1.1) of the first document 100A and block BK2 (3.1.1) of the second document 100B. However, the second similarity X2 between block BK1 (3.1.1) and block BK2 (3.2.1) is lower than the second similarity X2 between block BK1 (3.1.1) and block BK2 (3.1.1). Therefore, the combined similarity XA between block BK1 (3.1.1) and block BK2 (3.2.1) is lower than the combined similarity XA between block BK1 (3.1.1) and block BK2 (3.1.1). As a result, the document management system 10 avoids a situation in which block BK1 (3.1.1) is erroneously associated with block BK2 (3.2.1).

(2) When the relevance between the first block of the first document 100A and the second block of the second document 100B is actually high, the similarity between the block in the parent-parent level of the first block and the block in the parent-parent level of the second block is likely to be high. On the other hand, when the first block of the first document 100A is actually irrelevant to the second block of the second document 100B, the similarity between the block in the parent-parent level of the first block and the block in the parent-parent level of the second block is likely to low. Therefore, when the document management system 10 associates block BK1 of the first document 100A and block BK2 of the second document 100B, the third similarity X3 between the blocks is also taken into consideration. This further improves the accuracy of the association between block BK1 of the first level in the first document 100A and block BK2 of the first level in the second document 100B.

For example, the first similarity X1 between block BK1 (3.1.1) of the first document 100A and block BK2 (4.1.1) of the second document 100B is equal to the first similarity X1 between block BK1 (3.1.1) of the first document 100A and block BK2 (3.1.1) of the second document 100B. Further, the second similarity X2 between block BK1 (3.1.1) and block BK2 (4.1.1) is equal to the second similarity X2 between block BK1 (3.1.1) and block BK2 (3.1.1). However, the third similarity X3 between block BK1 (3.1.1) and block BK2 (4.1.1) is lower than the third similarity X3 between block BK1 (3.1.1) and block BK2 (3.1.1). Therefore, the combined similarity XA between block BK1 (3.1.1) and block BK2 (4.1.1) is lower than the combined similarity XA between block BK1 (3.1.1) and block BK2 (3.1.1). As a result, the document management system 10 avoids a situation in which block BK1 (3.1.1) is erroneously associated with block BK2 (4.1.1).

(3) The combined similarity XA is calculated such that the effect of the second similarity X2 on the combined similarity XA is less than that of the first similarity X1 on the combined similarity XA. Accordingly, block BK1 of the first document 100A is associated with block BK2 of the second document 100B in a state in which the similarity between the blocks in the parent level is considered to some extent and the similarity between the blocks in the subject level is most strongly considered. This improves the accuracy of the association between block BK1 of the first document 100A and block BK2 of the second document 100B.

(4) The combined similarity XA is calculated such that the effect of the third similarity X3 on the combined similarity XA is less than that of the first similarity X1 on the combined similarity XA. Accordingly, block BK1 of the first document 100A is associated with block BK2 of the second document 100B in a state in which the similarity between the blocks in the parent-parent level is considered to some extent and the similarity between the blocks in the subject level is most strongly considered. This improves the accuracy of the association between block BK1 of the first document 100A and block BK2 of the second document 100B.

(5) When the second similarity X2 is less than or equal to the determination value X2th, the combined similarity XA is calculated without using the second similarity X2. Therefore, when there is no relevance between the blocks in the parent level, block BK1 of the first document 100A is associated with block BK2 of the second document 100B without being affected by the parent level.

(6) When the third similarity X3 is less than or equal to the determination value X3th, the combined similarity XA is calculated without using the third similarity X3. Therefore, when there is no relevance between the blocks in the parent-parent level, block BK1 of the first document 100A is associated with block BK2 of the second document 100B without being affected by the parent-parent level.

Modified Examples

The above embodiment may be modified as follows. The above embodiment and the following modifications can be combined as long as the combined modifications remain technically consistent with each other.

The processing circuitry 21 may calculate the combined similarity XA such that the effect of the third similarity X3 on the combined similarity XA is substantially equal to that of the second similarity X2 on the combined similarity XA. In this case, the correction coefficient $\alpha 3$ may be equal to the correction coefficient $\alpha 2$ in the relational equation (D1).

The processing circuitry 21 may calculate the combined similarity XA such that the effect of the second similarity X2 on the combined similarity XA is substantially equal to that of the first similarity X1 on the combined similarity XA. In this case, the correction coefficient $\alpha 2$ in the relational equation (D1) may be set to 1.

The processing circuitry 21 may calculate the combined similarity XA such that the effect of the third similarity X3 on the combined similarity XA is substantially equal to that of the first similarity X1 on the combined similarity XA. In this case, the correction coefficient $\alpha 3$ in the relational equation (D1) may be set to 1.

The processing circuitry 21 may increase the first similarity X1 and calculate the combined similarity XA using the increased and corrected first similarity X1. In this case, the processing circuitry 21 decreases the effect of the second similarity X2 on the combined similarity XA to be less than that of the first similarity X1 on the combined similarity XA without decreasing the second similarity X2.

As long as the processing circuitry 21 calculates the combined similarity XA based on the second similarity X2, the processing circuitry 21 does not have to calculate the combined similarity XA based on the third similarity X3.

The processing circuitry 21 may calculate the combined similarity XA based on the second similarity X2 even when the second similarity X2 is less than or equal to the determination value X2th.

The processing circuitry 21 may calculate the combined similarity XA based on the third similarity X3 even when the third similarity X3 is equal to or less than the determination value X3th.

The processing circuitry 21 may calculate the combined similarity XA based on the first similarity X1 even when the first similarity X1 is equal to or less than the determination value X1th.

The processing circuitry 21 may calculate the first similarity X1, the second similarity X2, and the third similarity X3 by a method different from the method described in the above-described embodiment.

The subject documents do not have to be regulatory documents. The subject documents may include, for example, products instructions, specifications, legal documents, and treatises.

The document management system 10 may be an apparatus that compares a document before revision with a document after revision.

The subject document may not be a horizontally written document like the document shown in FIG. 2 but may be a vertically written document.

The processing circuitry 21 is not limited to a device that includes a CPU and a ROM and executes software processing. That is, the processing circuitry 21 may have any one of the following configurations (a), (b), and (c).

(a) The processing circuitry 21 includes one or more processors that execute various processes in accordance with a computer program. Each processor includes a CPU and a memory, such as a RAM and a ROM. The memory stores program codes or commands that are configured to have the CPU execute processes. The memory, which is a computer readable medium, may be any available medium that is accessible by a versatile or dedicated computer.

(b) The processing circuitry 21 includes one or more exclusive hardware circuits that execute various processes. Examples of the exclusive hardware circuit include an application specific integrated circuit (ASIC), a field programmable gate array (FPGA), and the like.

(c) The processing circuitry 21 includes a processor that executes part of various processes in accordance with a computer program and an exclusive hardware circuit that executes the remaining processes.

The phrase "at least one of" as used in this disclosure means "one or more" of a desired choice. As an example, the expression "at least one" as used herein means "only one option" or "both two options" if the number of options is two. As another example, the expression "at least one" used herein means "only one option" or "a combination of any two or more options" if the number of options is three or more.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A document management system configured to manage documents, wherein each of the documents has a hierarchical structure, and the hierarchical structure includes at least a first level and a second level higher than the first level, the document management system comprising: processing circuitry, wherein the processing circuitry is configured to calculate a first similarity between a block in the first level of a first document and a block in the first level of a second document; the processing circuitry is configured to calculate a similarity between a block in the second level of the first document and a block in the second level of the second document as a second similarity between the block in the first level of the first document and the block in the first level of the second document; the processing circuitry is configured to calculate a combined similarity such that the combined similarity increases as the first similarity increases and such that the combined similarity increases as the second similarity increases; and the processing circuitry is configured to associate the block in the first level of the first document with the block in the first level of the second document based on the combined similarity, wherein the processing circuitry is configured to calculate the combined similarity such that an effect of the second similarity on the combined similarity is less than that of the first similarity on the combined similarity.

2. The document management system according to claim 1, wherein when the second similarity is less than or equal to a determination value, the processing circuitry is configured to calculate the combined similarity based only on the first similarity.

3. The document management system according to claim 1, wherein the hierarchical structure further includes a third level higher than the second level, the processing circuitry is configured to calculate a similarity between a block in the third level of the first document and a block in the third level of the second document as a third similarity between the block in the first level of the first document and the block in the first level of the second document; and the processing circuitry is configured to calculate the combined similarity such that the combined similarity increases as the third similarity increases.

4. The document management system according to claim 3, wherein the processing circuitry is configured to calculate the combined similarity such that an effect of the second similarity on the combined similarity is less than that of the first similarity on the combined similarity, and an effect of the third similarity on the combined similarity is less than that of the second similarity on the combined similarity.

* * * * *